March 22, 1932. F. L. SCOTT 1,850,358

SCRAPING WASHER FOR DISK BITS

Filed July 11, 1930

Floyd L. Scott Inventor

By Jesse R. Stone

Attorney

Patented Mar. 22, 1932

1,850,358

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

SCRAPING WASHER FOR DISK BITS

Application filed July 11, 1930. Serial No. 467,169.

My invention relates to earth boring drills such as are employed in deep well drilling. The invention pertains particularly to drills of the so-called disk type in which the cutters are disk shaped and mounted to rotate on bearings on the head of the drill. In mounting disk shaped cutters upon the head of the drill, it is desirable to incline the disks apart adjacent the lower end, so that the cutters will have a better rolling action on the bottom of the hole. When this is done, however, there is a portion of the bottom of the hole between the cutters which is not completely cut away. A core is formed on the bottom of the hole, which is engaged by the head, thus holding up the progress of the drill.

It is an object of my invention to provide means in addition to the rolling cutters of the drill to engage and cut away the central portion of the well bottom.

I desire to employ a washer between the cutter and the head of the bit and to form a scraping cutter on said washer positioned in such manner as to cut the bottom of the hole between the two rolling disks.

Figure 1:
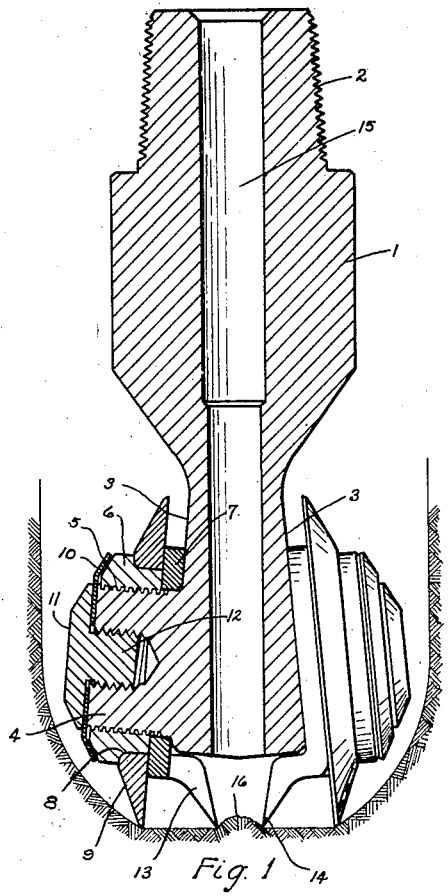
Figure 4:
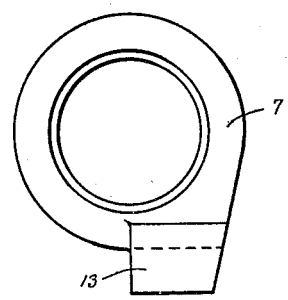
Figure 3:
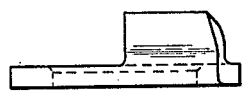
Figure 2:
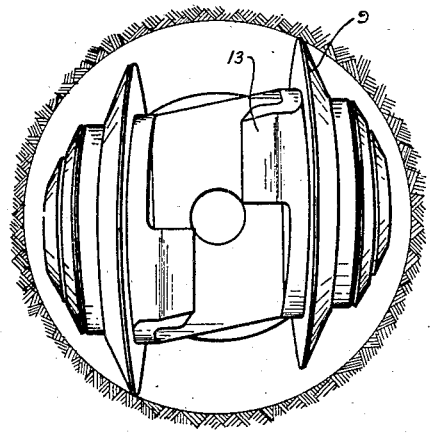

Referring to the drawings herewith, Fig. 1 is a central longitudinal section of a disk drill showing my invention employed thereon. In Fig. 2 is a bottom plan view of the drill shown in Fig. 1. Fig. 3 is a side elevation of the washer embodying my invention. Fig. 4 is a side elevation taken at right angles to the view shown in Fig. 3.

I have shown my invention as applied to a disk bit of the usual construction. There is a bit head 1 having an upper shank 2 threaded for engagement with the drill collar. The lower end of the head is flattened and provided with two opposite faces 3. The said faces diverge slightly toward the lower end, and cutter shafts 4 are formed thereon in a position perpendicular to the faces 3, thus giving said shafts a slight upward inclination.

Said shafts are threaded at 5 to receive a bushing 6. Between the bushing and the faces 3 of the head is a washer 7. The inner side of the bushing 6 is provided with a bearing recess 8 to receive the disk shaped cutter 9. The cutter with its bushing and the washer 7 are held in position upon the shaft through the threaded engagement of the bushing with the shaft and by a lock washer and pin. Said washer is held in position against the outer face of the bushing by means of a cap 11. Said cap has a threaded pin 12 thereon engaging within a recess in the outer end of the shaft 4 and acts as a locking means to prevent accidental removal of the cutter and the bushing.

The washer 7 which acts as a thrust bearing on the inner side of the cutter also acts as a support for a cutting blade 13. Said blade is preferably formed integral with the washer and extends inwardly below the lower end of the head and is then directed downwardly and formed with the sharp cutting edge 14. As will be seen from Fig. 1, this cutting edge comes approximately flush with the lower edges of the disk 9. The manner in which the blade 13 is formed upon the washer 7 is best seen in Fig. 4. The blade is offset from the axis of the drill so as to be positioned adjacent the forward or the advancing side of the adjacent disk. With reference to Fig. 2, it will thus be seen that the blades 13 are staggered relative to each other, one at one side of the axis of the head, and the other on the opposite side. There is a central water course 15 extending axially of the head to discharge the flushing fluid directly upon the bottom of the hole.

In the operation of this drill, it is to be noted that the cutters 9 are offset in the usual manner relative to each other, and one of said disks will engage the wall of the hole on one side of the head, while the opposite disk will engage the wall of the hole on the opposite side of the head. These cutters will cut away the side wall down to a point spaced from the center of the drill. The cutting blades 13 upon the washers will cut the inner portion of the hole left uncut by the disks. There will be a small portion 16 of the well bottom, which is not directly engaged by the blades 13 but which will be broken away due to vibration or lateral movement of the bit in its operation.

By the use of my improved type of washer on which the cutting blades 13 are formed, I am enabled to use a desirable form of disk drill and still cut the full bottom of the hole so that the bit will be enabled to advance without hindrance. The structure is a simple one, easily assembled and economical to manufacture.

What I claim as new is:

1. An earth boring drill including a head, two disk-shaped cutters mounted in offset position thereon, their lower sides diverging from the axis of the drill, and washers adjacent said cutters formed with downwardly extending cutting blades to cut the bottom of the hole between said cutters.

2. An earth boring drill including a head, two disk-shaped cutters mounted in offset position thereon, their lower sides diverging from the axis of the drill, and washers adjacent said cutters formed with downwardly extending cutting blades to cut the bottom of the hole between said cutters, each blade being offset to one side of the axis of the drill.

3. An earth boring drill including a head, two opposed disk-shaped cutters, upwardly inclined shafts to support said cutters, and inwardly extending cutting blades mounted on said shafts adjacent said disk cutters to cut the central area of the well bottom.

4. An earth boring drill including a head, a pair of disk shaped rolling cutters, washers adjacent said disk cutters offset at each side of the axis of the drill and blades on said washers to cut adjacent the advancing edge of the disk cutters.

5. An earth boring drill including a head, cutter shafts on opposite sides of said head inclined upwardly, bushings on said shafts, rolling cutters on said bushings, washers on said shafts adjacent said bushings, and inwardly and downwardly directed cutting blades on said washers.

6. An earth boring drill including a head, cutter shafts on opposite sides of said head, bushings on said shafts, rolling cutters on said bushings, washers on said shafts adjacent said bushings, and inwardly and downwardly directed cutting blades on said washers.

In testimony whereof, I hereunto affix my signature, this the 5th day of July, A. D. 1930.

FLOYD L. SCOTT.